United States Patent Office 3,454,649
Patented July 8, 1969

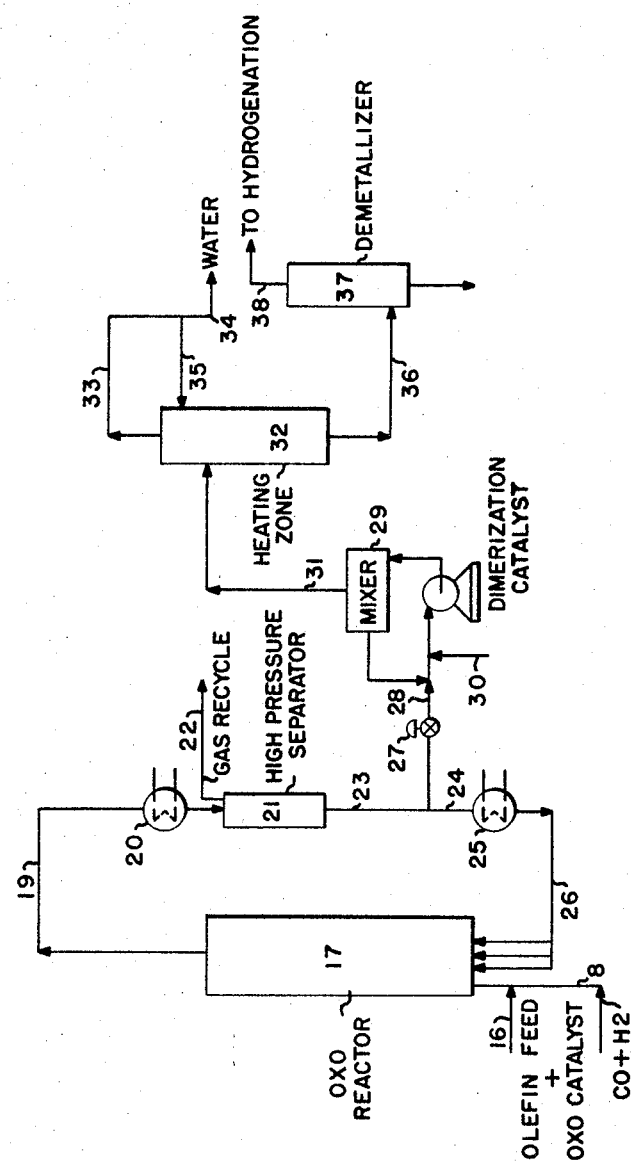

3,454,649
PREPARATION OF HIGH MOLECULAR WEIGHT OXYGENATED COMPOUNDS
Neville Leverne Cull, Baker, La., and Clyde Lee Aldridge, Baton Rouge, La., assignors to Esso Research and Engineering Company, a corporation of Delaware
Continuation-in-part of application Ser. No. 673,604, July 23, 1957. This application June 25, 1963, Ser. No. 290,465
Int. Cl. C07c 47/02, 45/08, 29/14
U.S. Cl. 260—601
18 Claims This application is a continuation-in-part of Ser. No. 673,604, filed July 23, 1957, and Ser. No. 82,630, filed Jan. 13, 1961, and both now abandoned, said Ser. No. 82,630 also being a continuation-in-part of Ser. No. 673,604.

The present invention relates to the preparation of oxygenated organic compounds by the reaction of olefins with hydrogen and carbon monoxide in the presence of a carbonylation catalyst. More specifically, the present invention relates to a novel process for producing high molecular weight alcohols containing two more carbon atoms than twice the number in the olefin feed.

It is well known in the art that oxygenated organic compounds may be synthesized from organic compounds containing olefinic linkages by a reaction with carbon monoxide and hydrogen in the presence of catalyst containing metals of the iron group in a two-stage process in which predominantly aldehydes and minor proportions of ketones and alcohols are formed in a first step in the presence of a carbonylation catalyst comprising metals of the iron group and particularly cobalt, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

The carbonylation or oxo reaction by which name this process is generally known, provides a particularly attractive method of preparing primary alcohols to supply the large market for plasticizers, detergents, solvents and the like. Amenable to the reaction to a greater or less degree are long and short chained olefinic compounds, not only hydrocarbons but most other organic compounds having a carbon-to-carbon olefinic linkage such as unsaturated alcohols, acids, esters and the like. Straight and branchchained olefins such as propylene, butene, pentene, hexene, heptene, styrene; olefin polymers such as di- and triisobutylene, hexene and heptene dimers, polypropylenes, olefinic fractions from the hydrocarbon synthesis process, thermal or catalytic cracking operations, and other sources of hydrocarbon fractions containing such olefins may be used as starting materials depending on the nature of the final product desired. The synthesis gas mixture fed to the first stage may be any desired ratio of $H_2$ to $CO$, preferably within the limits of 0.5 to 5 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general, about 2500 to 25,000 cubic feet of $H_2+CO$ per barrel of olefin feed are employed.

The catalyst for the first stage of the process is preferably employed in the form of an oil-soluble compound of the catalytically active carbonylation metal. Thus there have been employed the salts of the metals such as cobalt and high molecular weight fatty acids, such as stearic, oleic, naphthenic, linoleic and the like. Water soluble catalysts, such as cobalt acetate, chloride, and the like, have also been successfully employed. Catalyst concentrations may vary from about 0.05 to 5.0% by weight of the catalyst salt, calculated as cobalt based on the olefinic feed. The first stage or carbonylation reaction is generally carried out at temperatures in the range of from about 250° to 450° F. depending upon the nature of the olefin and other reaction conditions. In general, the lower olefins will react at lower temperatures and react to a greater extent than the high molecular weight olefins. The carbonylation reaction is an exothermic one, with a heat release of the same high order or magnitude as in the hydrocarbon synthesis process; about 35 to 50 kcal./grammol olefinic double bond reacted and, therefore, careful temperature control is required in the reaction zone to prevent decomposition of cobalt carbonyl to metallic cobalt and also to prevent formation of secondary reaction products and undesired reactions, such as hydrogenation of the olefin, formation of hydrocarbon synthesis product, and the like.

Versatile as this alcohol synthesis, or "Oxo" reaction is in the production of alcohols from olefins, the process in the past has not proved itself adaptable to the preparation in good yields of high molecular weight alcohols. These compounds are of particular importance commercially in the manufacture of detergents and a multitude of other purposes. It has been found that, as the molecular weight of the olefin increases, the conversion to the aldehyde falls off rapidly, and with olefins above about 12 carbon atoms, reaction rates are too slow and yields too low for a commercially feasible operation. The rate and yield decrease with increasing molecular weight of olefin is particularly evident in the case of highly branched olefins, such as those prepared by polymerizing low molecular weight olefins, i.e., the polymers and copolymers of propylene, butylenes and amylenes.

It is, therefore, a purpose of the present invention to disclose a novel process of producing substantial yields of high molecular weight primary alcohols by the carbonylation reaction.

It is a further purpose of the present invention to produce these high molecular weight dimer alcohols from olefins having a substantially lower molecular weight, which olefins are in considerably larger supply than high molecular weight olefins.

Other and further purposes and objects of the present invention will become more apparent hereinafter.

It has hitherto been found that, accompanying the main carbonylation reaction, i.e., the reaction wherein an olefin is converted to an aldehyde having one more carbon atom, there is formed a large number of secondary reaction products, such as esters, aldols, polymers, ketones and the like.

To overcome the shortcoming of the oxo reaction in this respect, resort has been made to the use of modifiers or cocatalysts which, when added to the carbonylation reaction, bring about the increased production of aldehydes having $2n+2$ carbon atoms from olefins having $n$ carbon atoms. By the use of such cocatalysts, higher molecular weight dimer aldehydes and upon hydrogenation, the corresponding dimer alcohols, can be obtained from the lower olefins. Among the more effective modifiers or cocatalysts are those comprising zinc, as described in Mason U.S. 2,811,567 and Mertzweiller et al. U.S. 2,820,067.

In accordance with the present invention, it has been found that high molecular weight alcohols, which will be referred to herein as dimer alcohols, may thus be produced from low molecular weight olefins by the carbonylation reaction, followed by hydrogenation, when the carbonylation stage is conducted in the presence of oil-soluble compounds of the metals in Group II–A of the Periodic Chart. These additives include the oil-soluble compounds or complexes of beryllium, magnesium, calcium, strontium and barium. The more common oil-soluble compounds are typified by the metal salts of high molecular weight acids, e.g., oleic, stearic, naphthenic, linoleic; the complexes with diketones, such as acetylacetone, alcoholates of the fatty alcohols such as decyl, tridecyl, etc., and other organic radicals which will provide an oil-soluble compound. The Group II–A metal acetyl-acetonate has been found to be especially useful in this process. Oil-soluble Group II–A metal complexes such as a complex of the metal with cobalt hydrocarbonyl and the like are also useful.

In another embodiment of the present invention has now been found that dimer aldehydes surprisingly are obtained when monomer aldehydes, e.g., aldehydes derived from the oxo reaction, are heated at elevated temperatures with oil-soluble compounds of the Group II–A metals of the Periodic Table. Not only are the dimer aldehydes produced in high yield in the presence of these catalysts, but the rate of dimerization is much more rapid than heretofore experienced with zinc comprising catalysts, and the selectivity to dimer product is greatly improved. By dimerizing oxo aldehydes in accordance with the process of the present invention, and hydrogenating the dimer aldehydes thus obtained, means are provided for producing high yields of primary monohydric alcohols having $2n+2$ carbon atoms from olefins having $n$ carbon atoms.

The present invention will best be understood from the more detailed description hereinafter, wherein reference will be made to the accompanying drawings which are schematic illustrations of the systems suitable for carrying out the embodiments of the invention.

FIGURE 2 shows a preferred embodiment employing a two step process of carbonylation and dimerization.

Figure 1:
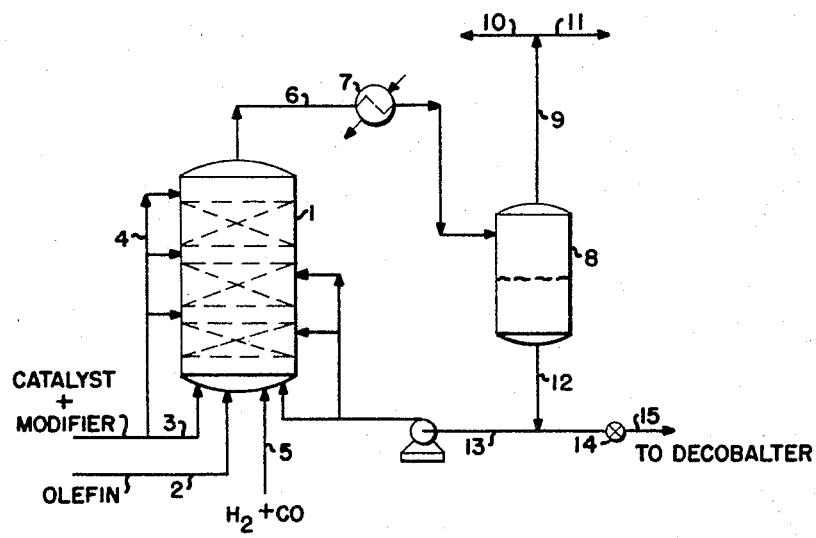
FIGURE 1 illustrates a system adopted to carry out the embodiment of the invention employing a single step carbonylation and dimerization reaction.

Referring now to FIGURE 1, an olefinic hydrocarbon is fed through feed line 2 to the bottom of primary reactor 1. The latter comprises a reaction vessel preferably divided into discrete zones separated by trays and free space. The reactor is preferably packed with inert solids to facilitate gas-liquid contact.

Also passed into reactor 1 are cobalt carbonylation catalyst and the Group II–A metal reaction modifier. In a preferred modification, a mixture of cobalt and reaction modifier is employed dissolved in the olefin feed and is admitted through line 2. It is to be understood that other forms of cobalt, such as an aqueous solution of a cobalt salt, i.e., cobalt acetate, or a slurry of oil-insoluble cobalt solids, such as cobalt oxide, metal, carbonate and the like, may be employed. Cobalt is generally to the extent of 0.1% to 0.5% calculated as metal on olefin feed, while the Group II–A metal compound is added to the extent of .002 to .2 mole/liter, preferably .01 to .05 mole/liter calculated as metal based on olefin feed.

Simultaneously, a gas mixture containing $H_2$ and CO in the approximate ratio of 0.5–2 volumes $H_2$ per mole CO is supplied through line 5 and flows concurrently with the olefinic and aldehyde product upwardly through reactor 1. The latter is preferably operated at pressures of about 2500–3500 p.s.i.g. and temperatures of 200 to 400° F.

Liquid oxygenated reaction products comprising aldehydes are withdrawn from the upper portion of reactor 1 through line 6. The product, which is at a temperature of about 300–375° F., is then passed to cooler 7, where the temperature is lowered to about 60–120° F., and then passed to high pressure gas-liquid separator 8. Herein separation of unreacted gases from liquid product occurs. The unreacted gases may be withdrawn through line 9, and after scrubbing, may be recycled to the system via line 10, or in part purged. Liquid aldehyde product containing high concentration of cobalt carbonyl is withdrawn from high pressure separator 8 through line 12. A portion of this stream is preferably passed via line 13 to aldehyde synthesis reactor 1 to supply both cooling and a portion of the catalyst requirements of that vessel, the amount of product recycled being a function of the amount of cooling required in the reactor. The recycled liquid is preferably added along the length of reactor 1. Other means for cooling may be employed if desired.

Liquid aldehyde product not recycled to reactor 1 is passed through pressure release valve 14 and line 15. This material, containing dissolved cobalt carbonyl and Group II metal compound is sent to a catalyst decomposition or decobalting zone, where in the presence of heat and steam, water, or dilute organic acid, the metal contaminants may be removed from the aldehyde product. The metal compounds may be decomposed by direct or indirect heating, e.g., steam, etc. or be made insoluble in the organic mixture by treatment with a low molecular weight organic acid such as acetic, oxalic, etc. Various demetallizing techniques are known and in this invention any one may be employed.

The aldehyde product, substantially completely free of inorganic compounds, is then hydrogenated under conventional conditions to alcohols and the alcohol product fractionated to produce both the $n+1$ and the $2n+2$ alcohols, as described.

Referring now to FIGURE 2, an olefin, preferably one having less than 15 carbon atoms, although olefins having from 2 to about 18 carbon atoms may be used, is passed through line 16 to the bottom of oxo reactor 18. A suitable catalyst such as cobalt oleate, may be dissolved therein to the extent of 0.1–5% by weight, based on cobalt. Reactor 17 is a high pressure vessel which is preferably packed with noncatalytic material, such as ceramic rings, and is preferably divided into discrete zones separted by support grids. A stream of synthesis gas comprising $H_2$ and CO is also passed into reactor 17 via line 18. Reaction conditions in the carbonylation zone comprise temperatures preferably in the range of about 250–375° F. and pressures of about 2500–3500 p.s.i.g. and a normal residence time of 1–3 hours, although lower temperatures and pressures may also be used.

Liquid aldehyde product, as well as secondary reaction products, containing catalyst and gases in solution are withdrawn upwardly through line 19 and passed through cooler 20 to high pressure gas-liquid separator 21, where unreacted gases are withdrawn overhead through line 22 for recycle. Liquid carbonylation product, the aldehyde content of which contains essentially one more carbon atom than the olefin feed admitted through line 16, is withdrawn from separator 21 via line 23. A portion of this stream may be recycled to reactor 17 via line 24, cooler 25 and line 26, to aid in cooling and controlling temperature in the carbonylation.

The balance of the oxo reaction product not recycled to reactor 17 is withdrawn through pressure release valve 27 and passed via line 28 to mixer 29. To the mixer there is supplied via line 30 an oil-soluble Group II–A metal compound, e.g., magnesium oleate, preferably dissolved in hydrocarbon or in a portion of the oxo product. About 0.002 to 5.0 weight percent, preferably 0.05 to 3.5 weight percent of catalyst, calculated as metal on aldehyde feed, is employed. After mixing, the material is passed via line 31 into heating zone 32.

The conditions in zone 32 will vary somewhat with the reactivity of the aldehyde feed, the amount of catalyst utilized, etc. In general, temperatures between 200° and 450° F. and pressures between atmospheric and 1000 p.s.i.g. are satisfactory. However, lower as well as higher temperatures, e.g., 150° F. and 550° F., respectively, may be used to advantage in some instances. The residence time in the heating zone will similarly vary with the particular aldehyde feed, catalyst, temperature, etc. At higher temperatures, or with reactive aldehyde feeds, residence times as low as 0.2 hour are entirely satisfactory. Generally speaking, with a particular aldehyde feed and catalyst, temperature and residence times are selected which will provide a satisfactory degree of conversion while still maintaining a high selectivity to dimer product.

While heating zone 32 may comprise merely a soaking vessel wherein the aldehyde containing feed and the dimerization catalyst are maintained at elevated temperatures until dimerization is substantially accomplished, it is preferred that heatng zone 32 comprise a distillation vessel wherein the reaction mixture can be refluxed. In this event, water of reaction, as well as the lower boiling components of the oxo product, are removed through line 33 and line 34. Recycle line 35 is provided so that any of the monomer aldehyde to be dimerized, inadvertently or otherwise removed along with the water, may be returned to the heating zone. In this way, not only is the monomer aldehyde in the distillation vessel kept at maximum concentration, but the dimerizing mixture is maintained substantially anhydrous, thus enhancing the rate of dimerization.

The reaction product, now containing substantial quantities of dimeric aldehydes, is removed through line 36 and passed to a vessel 37 wherein the mixture is treated with hot water or steam, or demetallized by other means to remove inorganic materials, e.g., catalyst residues of the Goup II-A metals. The demetallized product is thereafter passed through line 38 to a hydrogenation zone (not shown) where, under conventional hydrogenation conditions and in the presence of a hydrogenation catalyst, conversion to dimer alcohols is accomplished.

The process of FIGURE 2 may be subjected to many modifications without departing from its spirit. Thus, the product of the oxo reaction may be subjected to purification, for example, by decobalting and/or distillation prior to adding the Group II-A metal dimerization catalyst. In this way, a dimerization feed more highly concentrated in monomer aldehydes having two hydrogen atoms on the carbon atom next adjacent the carbonyl function, is provided. Also, the use of the oil-soluble Group II-A metal compounds is not confined to the dimerization of oxo aldehydes. Any aliphatic aldehyde having active hydrogen, i.e., alpha hydrogen, may be dimerized in the presence of these novel catalysts. It is preferred, however, to use aldehydes having 2 alpha hydrogen atoms and less than 15 carbon atoms, since such aldehydes readily dimerize in the presence of the Group II-A metal catalysts, and the dimer products upon hydrogenation provide high yields of primary monohydric alcohols.

The invention may be further illustrated by the following specific examples.

EXAMPLE 1

One liter of $C_7$ UOP olefin was oxonated at 350° F., and 3000 p.s.i.g. of 1.1/1. $H_2$/CO gas pressure with a six hour residence time. The catalyst consisted of 0.033 mole of cobalt oleate. The metal additive consisted of 0.022 mole of beryllium acetylacetonate. The reaction mixture was then freed of cobalt carbonyl by heating to 350° F. under 500–1000 p.s.i.g. hydrogen pressure. Hydrogenation of the product was accomplished by treating the decobalted product with 12 vol. percent of reduced nickel catalyst at 3000 p.s.i.g. of CO free hydrogen pressure for 6 hours at 350° F. The product was distilled at 20 mm. pressure after hydrocarbon was removed at atm. pressure in a 1 inch 30 plate Oldershaw column at 5/1 reflux ratio. The product was found to consist of the following:

| Component | B.R., ° F. at 20 mm. press. | Wt. percent |
|---|---|---|
| Hydrocarbon | Initial–¹ 265 | 16.3 |
| $C_8$ alcohol | ¹ 265–225 | 53.2 |
| Intermediate | 225–330 | 4.1 |
| $C_{16}$ alcohol | 330–360 | 14.1 |
| Bottoms | 360+ | 11.2 |

¹ Atmospheric pressure.

EXAMPLE 2

A run was made similar to Example 1 except that 0.022 mole of magnesium oleate was used in place of the beryllium acetyl acetonate.

The product consisted of the following:

| Component | B.R., ° F. at 20 mm. press. | Wt. percent |
|---|---|---|
| Hydrocarbon | Initial–¹ 265 | 18.8 |
| $C_8$ alcohol | ¹ 265–225 | 56.1 |
| Intermediate | 225–330 | 3.1 |
| $C_{16}$ alcohol | 330–360 | 12.8 |
| Bottoms | 360+ | 8.7 |

¹ Atmospheric pressure.

EXAMPLE 3

A run was made similar to Example 1 except that 0.022 mole of barium oleate was used in place of the beryllium acetyl acetonate. The product consisted of the following:

| Component | B.R., ° F. at 20 mm. press. | Wt. percent |
|---|---|---|
| Hydrocarbon | Initial–¹ 265 | 17.8 |
| $C_8$ alcohol | ¹ 265–225 | 51.9 |
| Intermediate | 225–330 | 3.8 |
| $C_{16}$ alcohol | 330–360 | 14.8 |
| Bottoms | 360+ | 8.6 |

¹Atmospheric pressure.

EXAMPLE 4

700 grams of UOP $C_7$ olefin was oxonated at 350° F. and 3000 p.s.i.g. with 1.1/1. $H_2$/CO gas for 10 hours. The catalyst consisted of 5.6 grams Co(acetate)$_2$·4H$_2$O (.2 wt. percent Co) and 12.5 grams Mg(acetate)$_2$·4H$_2$O (.2 wt. percent Mg). The mixture was demetallized and hydrogenated for six hours at 350° F. using 20 vol. percent reduced nickel catalyst at 3000 p.s.i.g. of methanized hydrogen. Distillation of the hydro product at 20 mm. pressure after the hydrocarbon was removed at atmospheric pressure gave the following results. Boiling ranges same as in previous example.

Component: Weight percent
- Hydrocarbon _____ 11.7
- $C_8$ alcohol _____ 69.7
- Intermediate _____ 5.7
- $C_{16}$ alcohol _____ 3.6
- Bottoms _____ 9.0

EXAMPLE 5

This run was the same as the preceding example with the exception that .2 wt. percent Mg as magnesia based on olefin feed was used as a catalyst modifier.

Product distribution of the distilled product was as follows: Boiling ranges same as in Example 3.

Component: Weight percent
- Hydrocarbon _____ 14.7
- $C_8$ alcohol _____ 67.3
- Intermediate _____ 7.6
- $C_{16}$ alcohol _____ 2.5
- Bottoms _____ 7.9

EXAMPLE 6

700 grams of UOP $C_7$ olefin were oxonated with a catalyst consisting of 7 grams $Co(Ac)_2 \cdot 4H_2O$ (.23 wt. percent Co on olefin) 7.0 grams of $CaCO_3$ (.4 wt. percent Ca) 9 grams acetic acid and 70 grams of $H_2O$. Oxonation conditions were 21 hours at 350° F. 1.1/1. $H_2/CO$ ratio at 3000 p.s.i.g. Hydrogenation and distillation were carried out as in Examples 1–4. The product consisted of the following:

| Component | Wt. percent | Adj. to 100% |
|---|---|---|
| Hydrocarbon | 13.6 | 14.5 |
| $C_8$ alcohol | 71.5 | 76.0 |
| Intermediate | 3.2 | 3.4 |
| Bottoms | 5.7 | 6.1 |

Essentially no material boiling in the $C_{16}$ alcohol range (330–360° F.@20 mm.) was found.

EXAMPLE 7

Triplicate control runs were made similar to Example 1 except that no metal additive to the oxo reaction was used. The product consisted of the following:

| Component | B.R., °F. at 20 mm. Hg press. | Wt. percent | | |
|---|---|---|---|---|
| Hydrocarbon | Initial–[1]265 | 18.0 | 22.5 | 20.0 |
| $C_8$ alcohol | [1]265–225 | 62.0 | 64.0 | 65.5 |
| Intermediate | 225–330 | 6.0 | 5.5 | 4.0 |
| $C_{16}$ alcohol | 330–360 | 2.0 | 2.5 | 2.0 |
| Bottoms | 360+ | 12.0 | 5.5 | 8.5 |

[1] Atmospheric pressure temperature.

These data show the marked directional effect in the production of $C_{16}$ alcohol from $C_7$ olefins when oil-soluble Group II–A metal compounds are employed. It will be noted that very little or no dimer alcohol yield is obtained when employing oil-insoluble forms of these metals.

Though the invention has shown at length the conversion of heptenes to $C_{16}$ alcohols, the invention is not restricted thereto. With higher boiling olefins corresponding higher boiling alcohols are produced, thus affording, for example, economical preparation of $C_{12}$–$C_{24}$ alcohols.

Dimer alcohols also may be produced by thermally soaking the crude aldehyde product in the presence of the modifiers noted above. Typical conditions which may be employed for the thermal soaking are 0.05–5 wt. percent of modifier for 2 to 48 hours at 200°–450° F. and at atmospheric conditions to 1000 p.s.i.g. Preferably, the modifier employed should be soluble in the oxygenated product. The most outstanding results are achieved by contacting or thermally soaking the aldehyde product in the presence of the aforesaid modifiers prior to the decobalting operation. There is apparently some coaction between the cobalt catalyst and the modifier which effects good yields of the desired dimer product. The following is an example of the thermal soaking technique.

EXAMPLE 8

One liter of $C_7$ UOP olefin is oxonated for 6 hours at 350° F. and 3000 p.s.i.g. with $H_2/CO$ gas pressure ratio of 1:1. The cobalt-containing catalyst comprises 0.033 mole of cobalt oleate. The reaction product is then passed to a thermal soaking drum wherein a 0.5 wt. percent of magnesium oleate calculated as magnesium on the oxygenated product is added and the mixture maintained at 350° F. for 6 hours. The resulting product will contain substantial amounts of dimer aldehyde. Demetallizing and hydrogenation is carried out as noted in Example 1 to produce the $C_{16}$ alcohol. Advantageously, if the thermal soaking is carried out prior to decobalting, the cobalt and metal modifier may be removed in a single step.

EXAMPLE 9

Butyraldehyde was dimerized by heating to between 347° and 437° F. with sufficient catalyst to provide 0.2 weight percent metal based on aldehyde. To obtain the specified temperature, a nitrogen pressure of about 175 p.s.i.g. was maintained in the heating vessel. Water formed during the dimerization reaction was continuously removed as reflux. The conversion and selectivity to dimer aldehyde are given in the following table:

| Catalyst | Conversion, percent | | | Selectivity to dimer, percent | | |
|---|---|---|---|---|---|---|
| | 15 min. | 30 min. | 50 min. | 15 min. | 30 min. | 50 min. |
| Magnesium oleate | 82 | 95 | | 92 | 92 | |
| Calcium stearate | | | 91 | | | 86 |
| Zinc decanoate | 44 | 59 | | 62 | 71 | |

These data show the effectiveness of the oil-soluble Group II–A metal compounds in converting monomer aldehydes to dimer aldehydes. It will be noted that the compounds of the Group II–A metals, magnesium and calcium, provide a substantial improvement over the Group II–B zinc catalyst in rapidity of dimerization as well as in conversion and selectivity.

EXAMPLE 10

N-heptaldehyde was refluxed at atmospheric pressure in the presence of 0.2 weight percent magnesium in the form of magnesium stearate. The following data were obtained:

| | Temp., °C. | Conversion, percent | Selectivity to dimer, percent |
|---|---|---|---|
| Time, min.: | | | |
| 0 | 132 | | |
| 7 | 155 | 53.1 | 99 |
| 13 | 184 | 79.5 | 97 |
| 19 | 233 | 93.4 | 97.9 |

The initial boiling point of the refluxing reaction mixture was lower than the normal boiling point of the heptaldehyde due to the rapidity of the dimerization reaction and the release of water of reaction.

For comparison purposes, this example was repeated using zinc stearate (0.2 weight percent of zinc) in place of the magnesium stearate of the present invention. The following data were obtained:

| | Temp., °C. | Conversion, percent | Selectivity to dimer, percent |
|---|---|---|---|
| Time, min.: | | | |
| 0 | 151 | | |
| 27 | 172 | 32.5 | 91 |
| 65 | 204 | 71.2 | 85 |
| 123 | 260 | 93.2 | 85.5 |

These data emphasize the superiority of the Group II–A metal catalysts of the present invention as compared to zinc. It will be noted that in the presence of magnesium stearate, a high conversion of the monomer aldehyde is realized within a short interval of time, and the selectivity to dimer product approaches 100 percent. In comparison, the zinc catalyzed reaction is not only very slow, but suffers also in the degree of selectivity.

EXAMPLE 11

Example 2 was repeated except that 0.2 weight percent of strontium, added as the stearate, was used as the catalyst. These data were obtained:

| | Temp., °C. | Conversion, percent | Selectivity to dimer, percent |
|---|---|---|---|
| Time, min.: | | | |
| 0 | 146 | | |
| 18 | 158 | 11.0 | |
| 89 | 182 | 55 | 91.9 |
| 190 | 234 | 80.4 | 94.0 |

These data illustrate the improved selectivity to dimer aldehydes that is obtained when an oil-soluble strontium compound is utilized as the dimerization catalyst. High selectivities are similarly obtained when oil-soluble beryllium and barium compounds especially beryllium and barium soaps, are substituted for the strontium stearate.

EXAMPLE 12

Propylene was oxonated in a continuous pilot unit using aqueous cobaltous acetate as the oxonation catalyst, a temperature of about 250° F., and 3000 p.s.i.g. of synthesis gas having a ratio of about 1.5 $H_2/CO$. The product was decobalted by stirring with 10 weight percent water for 30 minutes at 250° F., and then distilled to separate the predominantly iso-$C_4$ aldehyde fraction from the bottom fraction which consisted principally of n-butyraldehyde. The bottom fraction was heated for 3 hours at 380–480° F. in the presence of magnesium oleate (0.2 weight percent Mg based on feed). Water was continuously distilled from the reaction mixture as it formed. The following distribution of products was obtained:

| | Weight percent |
|---|---|
| Iso-$C_4$ aldehyde | 5 |
| n-$C_4$ aldehyde | 9 |
| Intermediate fraction | 10 |
| $C_8$ aldehydes | 58 |
| Bottoms | 18 |

The high conversion of $n+1$ aldehyde to $2n+2$ aldehyde obtained in this example is typical of the effectiveness of the oil-soluble Group II–A metal catalysts of the present invention.

EXAMPLE 13

$C_8$ oxo aldehyde, prepared by oxonation of a $C_7$ UOP polymer olefin, was refluxed under about 25 p.s.i.g. nitrogen pressure in the presence of 0.2 weight percent, based on metal, of magnesium tallate. Water of reaction was removed as it formed. These data were obtained:

| | Temperature, °C. | Conversion, percent | Selectivity to dimer, percent |
|---|---|---|---|
| Time, hrs.: | | | |
| 0 | 187 | | |
| 0.25 | 220 | 51 | * |
| .5 | 238 | 75 | * |
| 1.0 | 265 | 70 | * |

*No by-products could be detected, indicating essentially 100 percent selectivity to $C_{16}$ dimer aldehydes.

EXAMPLE 14

A $C_{10}$ oxo aldehyde, prepared from a $C_9$ UOP polymer feed, was refluxed at atmospheric pressure with 0.2 weight percent, based on metal, of magnesium tallate. Water of reaction was removed as it formed. These data were obtained:

| | Temperature, °C. | Conversion, percent | Selectivity to dimer, percent |
|---|---|---|---|
| Time, hrs.: | | | |
| 0 | 160 | | |
| 1 | 225 | 58 | * |
| 2.5 | 230 | 70 | * |

*No by-products could be detected, indicating essentially 100 percent selectivity to $C_{20}$ dimer aldehydes.

While the foregoing examples illustrate the improved results obtained when specific oil-soluble Group II–A metal compounds are utilized as dimerization catalysts in the oxo reaction and as dimerization catalysts in a separate step, it is not intended to thereby limit the invention. As will be apparent to those skilled in the art from the teaching herein, other oil-soluble Group II–A metal compounds, and especially compounds such as the metal soaps which provide a source of metal ions, also are desirable catalysts for the dimerization of aldehydes. Similarly, other modifications in the process of the invention may be made without departing from the spirit or scope thereof which is intended to be limited only by the appended claims.

What is claimed is:

1. The process for converting an olefinic compound having $n$ carbon atoms in the molecule into aldehyde compounds having $2n+2$ carbon atoms which comprises passing said olefinic compound, hydrogen, carbon monoxide, a cobalt carbonylation catalyst and a reaction modifier comprising an oil-soluble Group II–A metal compound into a carbonylation zone, said metal compound being employed in an amount sufficient to substantially increase the yield of said aldehyde compounds, maintaining elevated temperatures and pressure in said zone and withdrawing the aldehyde compounds from said zone.

2. The process of claim 1 wherein said reaction modifier is a beryllium containing compound.

3. The process of claim 1 wherein said reaction modifier is a magnesium compound.

4. The process of claim 1 wherein said reaction modifier is a barium compound.

5. An improved process for producing primary monohydric alcohols having $2n+2$ carbon atoms from an olefin having $n$ carbon atoms, $n$ being not more than 12, which comprises reacting olefin in a reaction zone with hydrogen and carbon monoxide in the presence of a cobalt carbonylation catalyst and a reaction modifier comprising an oil-soluble metal compound selected from the group consisting of beryllium, magnesium, calcium, strontium and barium compounds, said metal compound being added in an amount sufficient to substantially increase the alcohol yield, maintaining the temperature between about 250 and 450° F. and the pressure between about 1500 to 4500 p.s.i.g. in said reaction zone, withdrawing an aldehyde comprising reaction product from said reaction zone, removing the metal-comprising components from said reaction product, hydrogenating said aldehyde product and recovering a primary monohydric alcohol having $2n+2$ carbon atoms.

6. The process of claim 5 wherein about 0.002 to 0.2 mole of said metal compound is added to the reaction zone per liter of olefin, calculated as metal.

7. The process of claim 5 wherein said metal compound is beryllium acetyl acetonate.

8. The process of claim 5 wherein said metal compound is magnesium oleate.

9. The process of converting heptenes to primary isohexadecyl alcohols which comprises contacting a heptene fraction in a reaction zone with hydrogen and carbon monoxide, said hydrogen and carbon monoxide being in a volume ratio of about 0.5 to 5:1, about 0.05 to 0.5% cobalt oleate, calculated as cobalt on heptene, and about 0.002 to 0.2 mole of a metal oil-soluble compound selected from the group consisting of beryllium, magnesium, calcium, strontium and barium compounds per liter of said heptenes, calculated as metal, said metal oil-soluble compound being dissolved in said heptene fraction, maintaining the temperature between about 250 and 375° F. and the pressure between about 1500 and 4500 p.s.i.g. in the reaction zone, withdrawing an aldehyde comprising reaction product from the reaction zone, freeing said product of dissolved and suspended cobalt and metal components, hydrogenating said aldehyde product and recovering a primary isohexadecyl monohydric alcohol product.

10. In the preparation of oxygenated compounds from an olefinic compound wherein the olefinic compound is reacted with carbon monoxide and hydrogen at elevated temperatures and pressures in the presence of a cobalt-containing catalyst, the improvement which comprises contacting said oxygenated compounds with a Group II-A metal compound soluble in said oxygenated compounds at 150°–550° F. and at pressures of from atmospheric to 1000 p.s.i.g. to produce substantial amounts of aldehydic compounds containing two more than twice the number of carbon atoms in the starting olefinic compound.

11. In the preparation of oxygenated compounds from an olefinic compound containing not more than 12 carbon atoms wherein the olefinic compound is reacted with carbon monoxide and hydrogen at elevated temperatures and pressures in the presence of a cobalt containing catalyst, the improvement which comprises contacting said oxygenated compounds in a heating zone with a metal compound, selected from the group consisting of beryllium, magnesium, calcium, strontium and barium, that is soluble in said oxygenated compounds at 150° to 550° F. and pressures of from atmospheric to 1000 p.s.i.g. to produce aldehydic compounds containing two more than twice the number of carbon atoms in the starting olefinic compound.

12. A process according to claim 11 in which water of reaction is removed from said heating zone as it forms.

13. A process according to claim 11 in which said metal compound is a magnesium salt of a $C_6$ to $C_{22}$ fatty acid.

14. In a process for producing $C_8$ alcohols from propylene in which propylene, carbon monoxide and hydrogen are reacted in the presence of a cobalt catalyst under carbonylation conditions to provide a mixture containing $C_4$ aldehydes and at least a portion of said mixture is hydrogenated to alcohols, the improvement which comprises passing at least a portion of said mixture into a distillation zone, removing from said distillation zone components of said aldehyde product boiling below n-butyraldehyde, separating from the resultant bottoms a fraction predominantly comprising n-butyraldehyde, and contacting said fraction with 0.05 to 1.0 weight percent, calculated as metal, of a magnesium compound soluble in said fraction at a temperature in the range of 150° to 550° F. and a pressure between about 0 and 1000 p.s.i.g., removing a product comprising $C_8$ aldehydes and hydrogenating at least a portion of said $C_8$ aldehydes to provide 2-ethylhexanol.

15. A process for dimerizing a monomer aldehyde having at least two alpha hydrogen atoms which comprises heating said monomer aldehyde at a temperature in the range of 150° to 550° F. and a pressure of 0 to 1000 p.s.i.g. in the presence of an oil-soluble compound of a Group II-A metal for a time sufficient to convert said monomer aldehydes at least in part to dimer aldehydes.

16. A process according to claim 15 in which said oil soluble compound of a Group II-A metal compound is a salt of a $C_6$ to $C_{22}$ fatty acid.

17. The process of heating a carbonyl-containing hydrocarbon represented by the formula:

wherein $R_1$ is an alkyl group having from 3 to 14 carbon atoms at a temperature of about 66° C. to about 288° C. in the presence of a magnesium salt of a $C_6$ to $C_{22}$ fatty acid.

18. The process of heating in the liquid phase a carbonyl-containing hydrocarbon represented by the formula:

wherein $R_1$ is an alkyl group having from 3 to 14 carbon atoms at a temperature of about 66° C. to about 288° C. in the presence of a magnesium salt of a $C_6$ to $C_{22}$ fatty acid.

References Cited

UNITED STATES PATENTS

| | | | |
|---|---|---|---|
| 2,345,111 | 3/1944 | Grundmann | 260—601 |
| 2,528,592 | 11/1950 | Hall et al. | 260—601 |
| 2,811,567 | 10/1957 | Mason | 260—604 |
| 2,820,067 | 1958 | Martzweiller et al. | 260—604 |
| 2,894,990 | 7/1959 | Wennerberg et al. | 260—604 |
| 2,919,292 | 12/1959 | Johnson et al. | 260—604 |
| 2,949,486 | 8/1960 | Weesner et al. | 260—604 |
| 3,060,236 | 10/1962 | Kollar et al. | 260—601 |

FOREIGN PATENTS 478,621  11/1951  Canada.

BERNARD HELFIN, *Primary Examiner.*

U.S. Cl. X.R.

252—431; 260—604, 638